US010475595B2

(12) United States Patent
Knopsnyder et al.

(10) Patent No.: US 10,475,595 B2
(45) Date of Patent: Nov. 12, 2019

(54) ULTRACAPACITOR FOR USE AT HIGH TEMPERATURES

(71) Applicant: AVX Corporation, Fountain Inn, SC (US)

(72) Inventors: Jonathan Robert Knopsnyder, Fountain Inn, SC (US); Shawn Hansen, Simpsonville, SC (US); Andrew P. Ritter, Simpsonville, SC (US)

(73) Assignee: AVX Corporation, Foutain Inn, SC (US)

( * ) Notice: Subject to any disclaimer, the term of this patent is extended or adjusted under 35 U.S.C. 154(b) by 0 days.

(21) Appl. No.: 15/598,885

(22) Filed: May 18, 2017

(65) Prior Publication Data

US 2017/0338055 A1 Nov. 23, 2017

Related U.S. Application Data

(60) Provisional application No. 62/339,173, filed on May 20, 2016.

(51) Int. Cl.
*H01G 11/18* (2013.01)
*H01G 9/00* (2006.01)
(Continued)

(52) U.S. Cl.
CPC ........... *H01G 11/18* (2013.01); *H01G 9/0003* (2013.01); *H01G 9/08* (2013.01); *H01G 11/24* (2013.01);
(Continued)

(58) Field of Classification Search
CPC ........ H01G 11/18; H01G 11/60; H01G 11/68; H01G 11/82; H01G 9/10; H01G 9/025;
(Continued)

(56) References Cited

U.S. PATENT DOCUMENTS 3,652,902 A 3/1972 Hart et al.
4,267,566 A 5/1981 Moresi, Jr.
(Continued)

FOREIGN PATENT DOCUMENTS

CN 101774567 A 7/2010
CN 101844765 B 1/2012
(Continued)

OTHER PUBLICATIONS

Product Information on TIMREX® Graphite and ENSACO™ Carbon Black from TIMCAL Ltd., 2004, 24 pages.
(Continued)

*Primary Examiner* — Nguyen T Ha
(74) *Attorney, Agent, or Firm* — Dority & Manning, P.A.

(57) ABSTRACT

An ultracapacitor that is in contact with a hot atmosphere having a temperature of about 80° C. or more is provided. The ultracapacitor contains a first electrode, second electrode, separator, nonaqueous electrolyte, and housing is provided. The first electrode comprises a first current collector electrically coupled to a first carbonaceous coating and the second electrode comprises a second current collector electrically coupled to a second carbonaceous coating. The capacitor exhibits a capacitance value within the hot atmosphere of about 6 Farads per cubic centimeter or more as determined at a frequency of 120 Hz and without an applied voltage.

37 Claims, 5 Drawing Sheets

(51) Int. Cl.
  *H01G 9/08* (2006.01)
  *H01G 11/32* (2013.01)
  *H01G 11/60* (2013.01)
  *H01G 11/68* (2013.01)
  *H01G 11/82* (2013.01)
  *H01G 11/24* (2013.01)

(52) U.S. Cl.
  CPC ............. *H01G 11/32* (2013.01); *H01G 11/60* (2013.01); *H01G 11/68* (2013.01); *H01G 11/82* (2013.01); *H01G 2009/0014* (2013.01); *Y02E 60/13* (2013.01)

(58) Field of Classification Search
  CPC .......... H01G 9/038; H01G 9/045; H01G 9/15; H01G 9/052
  See application file for complete search history.

(56) References Cited

U.S. PATENT DOCUMENTS

| | | | |
|---|---|---|---|
| 4,327,400 A | 4/1982 | Muranaka et al. | |
| 4,542,444 A | 9/1985 | Boland | |
| 4,683,516 A | 7/1987 | Miller | |
| 4,737,889 A | 4/1988 | Nishino et al. | |
| 5,064,805 A | 11/1991 | Otowa | |
| 5,079,674 A | 1/1992 | Malaspina | |
| 5,150,283 A | 9/1992 | Yoshida et al. | |
| 5,279,623 A | 1/1994 | Watanabe et al. | |
| 5,381,303 A | 1/1995 | Yoshida et al. | |
| 5,426,561 A | 6/1995 | Yen et al. | |
| 5,532,083 A | 7/1996 | McCullough | |
| 5,603,867 A | 2/1997 | Ohsaki et al. | |
| 5,621,607 A | 4/1997 | Farahmandi et al. | |
| 5,674,639 A * | 10/1997 | Urry ............... | H01M 2/0235 29/623.1 |
| 5,777,428 A | 7/1998 | Farahmandi et al. | |
| 5,796,574 A | 8/1998 | Saito et al. | |
| 5,850,331 A | 12/1998 | Matsumoto et al. | |
| 5,862,035 A | 1/1999 | Farahmandi et al. | |
| 5,876,787 A | 3/1999 | Avarbz et al. | |
| 5,907,472 A | 5/1999 | Farahmandi et al. | |
| 5,926,361 A | 7/1999 | Alford | |
| 5,965,054 A | 10/1999 | McEwen et al. | |
| 5,969,936 A | 10/1999 | Kawasato et al. | |
| 5,972,537 A | 10/1999 | Mao et al. | |
| 5,973,913 A | 10/1999 | McEwen et al. | |
| 5,989,464 A | 11/1999 | Saito et al. | |
| 6,019,803 A | 2/2000 | Oskam et al. | |
| 6,031,712 A | 2/2000 | Kurihara et al. | |
| 6,059,847 A | 5/2000 | Farahmandi et al. | |
| 6,064,561 A | 5/2000 | Harada et al. | |
| 6,064,562 A | 5/2000 | Okamura | |
| 6,072,692 A | 6/2000 | Hiratsuka et al. | |
| 6,072,693 A | 6/2000 | Tsushima et al. | |
| 6,094,788 A | 8/2000 | Farahmandi et al. | |
| 6,110,335 A | 8/2000 | Avarbz et al. | |
| 6,191,935 B1 | 2/2001 | Okamura et al. | |
| 6,195,251 B1 | 2/2001 | Suhara et al. | |
| 6,198,620 B1 | 3/2001 | Wei et al. | |
| 6,198,621 B1 | 3/2001 | Saito et al. | |
| 6,201,685 B1 | 3/2001 | Jerabek et al. | |
| 6,233,135 B1 | 5/2001 | Farahmandi et al. | |
| 6,264,707 B1 | 7/2001 | Ishikawa et al. | |
| 6,288,888 B1 | 9/2001 | Sakata et al. | |
| 6,291,069 B1 | 9/2001 | Noguchi et al. | |
| 6,304,426 B1 | 10/2001 | Wei et al. | |
| 6,310,762 B1 | 10/2001 | Okamura et al. | |
| 6,320,740 B1 | 11/2001 | Saito et al. | |
| 6,327,136 B1 | 12/2001 | Meguro et al. | |
| 6,335,858 B1 | 1/2002 | Vasechkin et al. | |
| 6,341,058 B1 | 1/2002 | Sakata et al. | |
| 6,349,027 B1 | 2/2002 | Suhara et al. | |
| 6,352,565 B2 | 3/2002 | Suhara et al. | |
| 6,356,432 B1 | 3/2002 | Danel et al. | |
| 6,377,441 B1 | 4/2002 | Ohya et al. | |
| 6,379,402 B1 | 4/2002 | Suhara et al. | |
| 6,383,427 B2 | 5/2002 | Ishikawa et al. | |
| 6,392,867 B1 | 5/2002 | Yamada et al. | |
| 6,402,792 B1 | 6/2002 | Hiratsuka et al. | |
| 6,414,837 B1 | 7/2002 | Sato et al. | |
| 6,424,517 B1 | 7/2002 | Ikeda et al. | |
| 6,430,031 B1 | 8/2002 | Farahmandi et al. | |
| 6,447,555 B1 | 9/2002 | Okamura et al. | |
| 6,449,139 B1 | 9/2002 | Farahmandi et al. | |
| 6,451,073 B1 | 9/2002 | Farahmandi et al. | |
| 6,459,564 B1 | 10/2002 | Watanabe et al. | |
| 6,466,429 B1 | 10/2002 | Volfkovich et al. | |
| 6,487,066 B1 | 11/2002 | Niiori et al. | |
| 6,493,210 B2 | 12/2002 | Nonaka et al. | |
| 6,507,480 B2 | 1/2003 | Nomoto et al. | |
| 6,525,923 B2 | 2/2003 | Ishikawa et al. | |
| 6,535,373 B1 | 3/2003 | Smith et al. | |
| 6,552,895 B1 | 4/2003 | Vassallo et al. | |
| 6,558,437 B2 | 5/2003 | Wei et al. | |
| 6,565,701 B1 | 5/2003 | Jerabek et al. | |
| 6,585,152 B2 | 7/2003 | Farahmandi et al. | |
| 6,602,742 B2 | 8/2003 | Maletin et al. | |
| 6,614,646 B2 | 9/2003 | Bogaki et al. | |
| 6,625,007 B2 | 9/2003 | Sakata et al. | |
| 6,625,008 B2 | 9/2003 | Watanabe et al. | |
| 6,627,252 B1 | 9/2003 | Nanjundiah et al. | |
| 6,628,504 B2 | 9/2003 | Volfkovich et al. | |
| 6,631,072 B1 | 10/2003 | Paul et al. | |
| 6,631,074 B2 | 10/2003 | Bendale et al. | |
| 6,638,385 B2 | 10/2003 | Ishikawa et al. | |
| 6,643,119 B2 | 11/2003 | Nanjundiah et al. | |
| 6,671,165 B1 | 12/2003 | Nakazawa et al. | |
| 6,697,249 B2 | 2/2004 | Maletin et al. | |
| 6,702,963 B2 | 3/2004 | Kibi et al. | |
| 6,710,999 B2 | 3/2004 | Kawasato et al. | |
| 6,717,795 B2 | 4/2004 | Nakazawa et al. | |
| 6,721,168 B2 | 4/2004 | Takeuchi et al. | |
| 6,728,095 B2 | 4/2004 | Suhara et al. | |
| 6,728,096 B1 | 4/2004 | Smith et al. | |
| 6,738,252 B2 | 5/2004 | Okamura et al. | |
| 6,741,450 B2 | 5/2004 | Nakazawa et al. | |
| 6,768,631 B2 | 7/2004 | Uehara et al. | |
| 6,800,222 B1 | 10/2004 | Noguchi et al. | |
| 6,804,108 B2 | 10/2004 | Nanjundiah et al. | |
| 6,808,845 B1 | 10/2004 | Nonaka et al. | |
| 6,813,139 B2 | 11/2004 | Bendale et al. | |
| 6,830,594 B2 | 12/2004 | Shinozaki et al. | |
| 6,831,826 B2 | 12/2004 | Iwaida et al. | |
| 6,836,097 B2 | 12/2004 | Turner et al. | |
| 6,842,328 B2 | 1/2005 | Schott et al. | |
| 6,842,330 B2 | 1/2005 | Farahmandi et al. | |
| 6,847,517 B2 | 1/2005 | Iwaida et al. | |
| 6,865,068 B1 | 3/2005 | Murakami et al. | |
| 6,887,617 B2 | 5/2005 | Sato et al. | |
| 6,898,067 B1 | 5/2005 | Hiratsuka et al. | |
| 6,911,281 B2 | 6/2005 | Sonoda et al. | |
| 6,912,116 B2 | 6/2005 | Takahashi et al. | |
| 6,914,768 B2 | 7/2005 | Matsumoto et al. | |
| 6,946,007 B2 | 9/2005 | Bendale et al. | |
| 6,955,694 B2 | 10/2005 | Bendale et al. | |
| 7,046,503 B2 | 5/2006 | Hinoki et al. | |
| 7,057,879 B2 | 6/2006 | Iwaida et al. | |
| 7,061,750 B2 | 6/2006 | Oyama et al. | |
| 7,068,494 B2 | 6/2006 | Fujino | |
| 7,090,946 B2 | 8/2006 | Mitchell et al. | |
| 7,092,239 B2 | 8/2006 | Nakazawa et al. | |
| 7,095,603 B2 | 8/2006 | Mahon et al. | |
| 7,095,604 B2 | 8/2006 | Noguchi et al. | |
| 7,102,877 B2 | 9/2006 | Mitchell et al. | |
| 7,116,545 B2 | 10/2006 | Farahmandi et al. | |
| 7,147,674 B1 | 12/2006 | Zhong et al. | |
| 7,154,738 B2 | 12/2006 | Oyama et al. | |
| 7,167,353 B2 | 1/2007 | Yuyama et al. | |
| 7,169,509 B2 | 1/2007 | Nobuta et al. | |
| 7,170,738 B2 | 1/2007 | Scheidegger et al. | |
| 7,173,806 B2 | 2/2007 | Hinoki et al. | |
| 7,173,807 B2 | 2/2007 | Kawasato et al. | |
| 7,177,139 B2 | 2/2007 | Oizumi | |

(56) References Cited

U.S. PATENT DOCUMENTS

| | | | |
|---|---|---|---|
| 7,209,341 B2 | 4/2007 | Yoshitake et al. |
| 7,224,574 B2 | 5/2007 | Fujino et al. |
| 7,227,737 B2 | 6/2007 | Mitchell et al. |
| 7,232,790 B2 | 6/2007 | Tanaka et al. |
| 7,236,349 B2 | 6/2007 | Miyaki et al. |
| 7,245,478 B2 | 7/2007 | Zhong et al. |
| 7,256,981 B2 | 8/2007 | Kosuda et al. |
| 7,262,511 B2 | 8/2007 | Osako et al. |
| 7,273,597 B2 | 9/2007 | Takeuchi et al. |
| 7,295,423 B1 | 11/2007 | Mitchell et al. |
| 7,310,219 B2 | 12/2007 | Kosuda et al. |
| 7,314,514 B2 | 1/2008 | Drummond et al. |
| 7,317,609 B2 | 1/2008 | Zhong et al. |
| 7,326,491 B2 | 2/2008 | Takahashi et al. |
| 7,327,556 B2 | 2/2008 | Ro et al. |
| 7,342,769 B2 | 3/2008 | Sato et al. |
| 7,342,770 B2 | 3/2008 | Mitchell et al. |
| 7,352,558 B2 | 4/2008 | Zhong et al. |
| 7,368,202 B2 | 5/2008 | Kurihara et al. |
| 7,388,740 B2 | 6/2008 | Ro et al. |
| 7,391,603 B2 | 6/2008 | Fujino et al. |
| 7,394,648 B2 | 7/2008 | Kondo et al. |
| 7,397,650 B2 | 7/2008 | Sato et al. |
| 7,403,371 B2 | 7/2008 | Miyaki et al. |
| 7,411,777 B2 | 8/2008 | Chiba |
| 7,436,651 B2 | 10/2008 | Takeda et al. |
| 7,486,497 B2 | 2/2009 | Kobayashi et al. |
| 7,491,352 B2 | 2/2009 | Ito |
| 7,492,571 B2 | 2/2009 | Zhong et al. |
| 7,492,573 B2 | 2/2009 | Takahashi et al. |
| 7,508,651 B2 | 3/2009 | Mitchell et al. |
| 7,554,793 B2 | 6/2009 | Chacko |
| 7,564,676 B2 | 7/2009 | Kitajima et al. |
| 7,567,429 B2 | 7/2009 | Mori et al. |
| 7,570,478 B2 | 8/2009 | Terada et al. |
| 7,616,430 B2 | 11/2009 | Ro et al. |
| 7,623,339 B2 | 11/2009 | Takahashi et al. |
| 7,623,340 B1 | 11/2009 | Song et al. |
| 7,639,475 B2 | 12/2009 | Ro et al. |
| 7,656,645 B2 | 2/2010 | Chiba |
| 7,706,130 B2 | 4/2010 | Shimoyama et al. |
| 7,708,787 B2 | 5/2010 | Hinoki et al. |
| 7,722,686 B2 | 5/2010 | Xi et al. |
| 7,754,382 B2 | 7/2010 | Kurihara et al. |
| 7,785,495 B2 | 8/2010 | Kikuchi et al. |
| 7,791,860 B2 | 9/2010 | Mitchell et al. |
| 7,791,861 B2 | 9/2010 | Zhong et al. |
| 7,800,886 B2 | 9/2010 | Itahashi et al. |
| 7,811,337 B2 | 10/2010 | Zhong et al. |
| 7,835,136 B2 | 11/2010 | Feaver et al. |
| 7,858,242 B2 | 12/2010 | Fujioka et al. |
| 7,864,508 B2 | 1/2011 | Fukumine |
| 7,897,281 B2 | 3/2011 | Yamakawa et al. |
| 7,911,767 B2 | 3/2011 | Sung et al. |
| 7,920,371 B2 | 4/2011 | Mitchell et al. |
| 7,923,411 B2 | 4/2011 | Tanaka et al. |
| 7,924,549 B1 | 4/2011 | Smith et al. |
| 7,933,114 B2 | 4/2011 | Baca et al. |
| 7,935,380 B2 | 5/2011 | Hinoki et al. |
| 7,948,738 B2 | 5/2011 | Shimamoto et al. |
| 7,948,739 B2 | 5/2011 | Zhamu et al. |
| 7,951,495 B2 | 5/2011 | Otsuki et al. |
| 7,986,510 B1 | 7/2011 | Smith et al. |
| 8,007,680 B2 | 8/2011 | Fujioka et al. |
| 8,027,147 B2 | 9/2011 | Miller et al. |
| 8,072,734 B2 | 12/2011 | Zhong et al. |
| 8,094,433 B2 | 1/2012 | Tian et al. |
| 8,124,474 B2 | 2/2012 | Mori et al. |
| 8,213,156 B2 | 7/2012 | Mitchell et al. |
| 8,277,691 B2 | 10/2012 | Lu |
| 8,279,580 B2 | 10/2012 | Zhong et al. |
| 8,300,385 B2 | 10/2012 | Baca et al. |
| 8,345,406 B2 * | 1/2013 | Dreissig ............... H01G 9/038 |
| | | 252/62.2 |
| 8,351,182 B2 | 1/2013 | Yamada et al. |
| 8,405,955 B2 | 3/2013 | Gadkaree et al. |
| 8,467,170 B2 | 6/2013 | Feaver et al. |
| 8,470,473 B2 | 6/2013 | Katai et al. |
| 8,475,676 B2 | 7/2013 | Aitchison et al. |
| 8,482,900 B2 | 7/2013 | Gadkaree et al. |
| 8,482,901 B2 | 7/2013 | Gadkaree et al. |
| 8,497,225 B2 | 7/2013 | Zhamu et al. |
| 8,541,338 B2 | 9/2013 | Gadkaree et al. |
| 8,559,162 B2 | 10/2013 | Shen et al. |
| 8,564,934 B2 | 10/2013 | Gadkaree et al. |
| 8,591,601 B2 | 11/2013 | Zhong et al. |
| 8,591,757 B2 | 11/2013 | Ohishi et al. |
| 8,614,020 B2 | 12/2013 | Kondo et al. |
| 8,705,225 B2 | 4/2014 | Ohashi et al. |
| 8,760,851 B2 | 6/2014 | Signorelli et al. |
| 8,767,376 B2 | 7/2014 | Takahashi et al. |
| 8,773,841 B2 | 7/2014 | Aitchison et al. |
| 8,780,527 B2 | 7/2014 | Thompson et al. |
| 8,785,057 B1 | 7/2014 | Smith et al. |
| 8,797,717 B2 | 8/2014 | Feaver et al. |
| 8,804,309 B2 | 8/2014 | Brandon et al. |
| 8,835,667 B2 | 9/2014 | Shinohara et al. |
| 8,842,417 B2 | 9/2014 | Gadkaree et al. |
| 8,848,338 B2 | 9/2014 | Norieda et al. |
| 8,911,510 B2 | 12/2014 | Leis et al. |
| 9,001,495 B2 | 4/2015 | Martini et al. |
| 9,006,136 B2 | 4/2015 | Gadkaree et al. |
| 9,034,517 B1 | 5/2015 | Smith et al. |
| 9,136,064 B2 | 9/2015 | Gadkaree et al. |
| 9,142,357 B2 | 9/2015 | Matsumoto |
| 9,164,082 B2 | 10/2015 | Inoue et al. |
| 9,214,661 B2 | 12/2015 | Naoi et al. |
| 9,218,917 B2 | 12/2015 | Brambilla et al. |
| 9,272,627 B2 | 3/2016 | Miller |
| 9,318,271 B2 | 4/2016 | Fletcher et al. |
| 9,355,790 B2 | 5/2016 | Holzwarth et al. |
| 9,368,776 B2 | 6/2016 | Horikawa et al. |
| 9,406,448 B2 | 8/2016 | Nagase et al. |
| 9,412,995 B2 | 8/2016 | Ogawa et al. |
| 9,425,000 B2 | 8/2016 | Lin et al. |
| 9,472,353 B2 | 10/2016 | Gadkaree et al. |
| 9,478,364 B2 | 10/2016 | Gadkaree et al. |
| 9,478,366 B2 | 10/2016 | Yokouchi et al. |
| 9,515,510 B2 | 12/2016 | Newlin |
| 9,525,168 B2 | 12/2016 | Mitchell et al. |
| 9,536,678 B2 | 1/2017 | Lane et al. |
| 9,558,894 B2 | 1/2017 | Signorelli et al. |
| 9,576,746 B2 | 2/2017 | Ueno et al. |
| 9,595,398 B2 | 3/2017 | Gadkaree et al. |
| 9,607,776 B2 | 3/2017 | Gadkaree et al. |
| 9,640,333 B2 | 5/2017 | Kumar et al. |
| 9,679,703 B2 | 6/2017 | Bendale et al. |
| 9,715,970 B2 | 7/2017 | Bendale et al. |
| 9,818,552 B2 | 11/2017 | Lane et al. |
| 9,991,060 B2 | 6/2018 | Bouchard et al. |
| 10,043,615 B2 | 8/2018 | Bendale et al. |
| 10,115,535 B2 | 10/2018 | Tsuzuki et al. |
| 10,141,122 B2 | 11/2018 | Feaver et al. |
| 2002/0094655 A1 | 7/2002 | Kasahara et al. |
| 2002/0138958 A1 | 10/2002 | Nonaka et al. |
| 2002/0159222 A1 * | 10/2002 | Nomoto ............... H01G 9/10 |
| | | 361/502 |
| 2002/0164441 A1 * | 11/2002 | Amine ............... B32B 15/08 |
| | | 428/35.2 |
| 2003/0172509 A1 | 9/2003 | Maletin et al. |
| 2004/0146786 A1 | 7/2004 | Sato et al. |
| 2004/0214078 A1 | 10/2004 | Mitani et al. |
| 2004/0214081 A1 | 10/2004 | Nobuta et al. |
| 2004/0229117 A1 | 11/2004 | Mitani et al. |
| 2004/0233613 A1 | 11/2004 | Kasahara et al. |
| 2005/0057888 A1 | 3/2005 | Mitchell et al. |
| 2005/0064289 A1 | 3/2005 | Suzuki et al. |
| 2005/0105247 A1 | 5/2005 | Lee et al. |
| 2005/0127319 A1 | 6/2005 | Fujioka et al. |
| 2005/0147885 A1 | 7/2005 | Sato et al. |
| 2005/0204527 A1 | 9/2005 | Hinoki et al. |
| 2005/0241137 A1 | 11/2005 | Suzuki et al. |
| 2005/0266298 A1 | 12/2005 | Mitchell et al. |
| 2006/0068284 A1 | 3/2006 | Takahashi et al. |

(56) References Cited

U.S. PATENT DOCUMENTS

| | | |
|---|---|---|
| 2006/0137158 A1 | 6/2006 | Zou et al. |
| 2006/0147712 A1 | 7/2006 | Mitchell et al. |
| 2006/0166094 A1 | 7/2006 | Suzuki |
| 2006/0183022 A1 | 8/2006 | Takahashi et al. |
| 2006/0246343 A1 | 11/2006 | Mitchell et al. |
| 2007/0070580 A1* | 3/2007 | Yoshida ............... H01G 9/038 361/502 |
| 2007/0122711 A1 | 5/2007 | Takahashi et al. |
| 2007/0146966 A1 | 6/2007 | Zhong et al. |
| 2007/0146967 A1 | 6/2007 | Xi et al. |
| 2007/0258193 A1 | 11/2007 | Zhong et al. |
| 2008/0013253 A1 | 1/2008 | Thrap et al. |
| 2008/0014139 A1 | 1/2008 | Zhong et al. |
| 2008/0016664 A1 | 1/2008 | Mitchell et al. |
| 2008/0081245 A1 | 4/2008 | Miller |
| 2008/0081251 A1 | 4/2008 | Miller |
| 2008/0089006 A1 | 4/2008 | Zhong et al. |
| 2008/0089012 A1 | 4/2008 | Kon et al. |
| 2008/0089013 A1 | 4/2008 | Zhong et al. |
| 2008/0102371 A1 | 5/2008 | Mitchell et al. |
| 2008/0106850 A1 | 5/2008 | Zhong et al. |
| 2008/0130202 A1* | 6/2008 | Ro ............... H01G 9/0425 361/516 |
| 2008/0201925 A1 | 8/2008 | Zhong et al. |
| 2008/0204973 A1 | 8/2008 | Zhong et al. |
| 2008/0241696 A1 | 10/2008 | Hinoki et al. |
| 2008/0286645 A1 | 11/2008 | Nobuta et al. |
| 2009/0097188 A1 | 4/2009 | Mitchell |
| 2009/0135548 A1 | 5/2009 | Yoshio et al. |
| 2009/0152510 A1 | 6/2009 | Ito |
| 2009/0268377 A1 | 10/2009 | Choi et al. |
| 2009/0279230 A1 | 11/2009 | Eilertsen et al. |
| 2009/0303658 A1* | 12/2009 | Hiroyuki ............... H01G 9/038 361/502 |
| 2009/0321678 A1 | 12/2009 | Zhong et al. |
| 2010/0033901 A1 | 2/2010 | Mitchell et al. |
| 2010/0055565 A1 | 3/2010 | Naoi et al. |
| 2010/0067173 A1 | 3/2010 | Guillet et al. |
| 2010/0110613 A1 | 5/2010 | Zhong et al. |
| 2011/0027537 A1 | 2/2011 | Inoue et al. |
| 2011/0110020 A1* | 5/2011 | Lin ............... H01G 9/038 361/502 |
| 2011/0149473 A1 | 6/2011 | Eilertsen et al. |
| 2011/0165318 A9 | 7/2011 | Zhong et al. |
| 2011/0182001 A1 | 7/2011 | Tanaka et al. |
| 2011/0299219 A1 | 12/2011 | Mitchell et al. |
| 2012/0040243 A1 | 2/2012 | Zhong et al. |
| 2012/0045685 A1 | 2/2012 | Seki et al. |
| 2012/0183886 A1 | 7/2012 | Zhong et al. |
| 2012/0187347 A1 | 7/2012 | Eilertsen et al. |
| 2012/0200308 A1 | 8/2012 | Donne |
| 2012/0236467 A1 | 9/2012 | Kang et al. |
| 2013/0141841 A1* | 6/2013 | Dreissig ............... H01G 9/035 361/505 |
| 2013/0330637 A1 | 12/2013 | Matsumoto et al. |
| 2013/0335884 A1 | 12/2013 | Gubin et al. |
| 2014/0002958 A1 | 1/2014 | Eilertsen |
| 2014/0029165 A1 | 1/2014 | Takahashi et al. |
| 2014/0057164 A1 | 2/2014 | Brambilla et al. |
| 2014/0072883 A1 | 3/2014 | Kondo et al. |
| 2014/0098465 A1 | 4/2014 | Bendale et al. |
| 2014/0098466 A1 | 4/2014 | Bilyk et al. |
| 2014/0118884 A1* | 5/2014 | Lin ............... C04B 35/14 361/502 |
| 2014/0126112 A1 | 5/2014 | Nguyen et al. |
| 2014/0268498 A1* | 9/2014 | Weaver ............... H01G 9/008 361/510 |
| 2014/0272542 A1 | 9/2014 | Rustomji |
| 2014/0346046 A1 | 11/2014 | Andelman |
| 2014/0368973 A1 | 12/2014 | Bouchard et al. |
| 2014/0377668 A1 | 12/2014 | Abe et al. |
| 2015/0002987 A1 | 1/2015 | Signorelli et al. |
| 2015/0062781 A1 | 3/2015 | Feaver et al. |
| 2015/0207114 A1 | 7/2015 | Khakhalev et al. |
| 2015/0244031 A1 | 8/2015 | Adamson et al. |
| 2015/0279578 A1 | 10/2015 | Martini et al. |
| 2015/0380175 A1* | 12/2015 | Rawal ............... H01G 11/12 361/502 |
| 2016/0111227 A1* | 4/2016 | Asay ............... C09D 5/24 361/502 |
| 2016/0204492 A1 | 7/2016 | Jiang et al. |
| 2017/0011862 A1 | 1/2017 | Tsuzuki et al. |
| 2017/0092440 A1 | 3/2017 | Gadkaree et al. |
| 2017/0104216 A1 | 4/2017 | Nagase et al. |
| 2017/0169959 A1 | 6/2017 | Cheng et al. |
| 2017/0244098 A1 | 8/2017 | Duong et al. |
| 2017/0256367 A1 | 9/2017 | Raman et al. |
| 2017/0309413 A1 | 10/2017 | Bendale et al. |
| 2017/0316889 A1 | 11/2017 | Martini et al. |
| 2017/0338054 A1 | 11/2017 | Knopsnyder et al. |
| 2017/0338059 A1 | 11/2017 | Knopsnyder et al. |
| 2017/0338061 A1 | 11/2017 | Knopsnyder et al. |
| 2017/0338669 A1 | 11/2017 | Hansen |
| 2017/0365420 A1 | 12/2017 | Horikawa et al. |
| 2018/0068803 A1 | 3/2018 | Brambilla et al. |
| 2018/0068804 A1 | 3/2018 | Brambilla et al. |
| 2018/0144878 A1 | 5/2018 | Ritter et al. |
| 2018/0204689 A1 | 7/2018 | Brambilla |
| 2019/0006059 A1 | 1/2019 | Nicolas et al. |

FOREIGN PATENT DOCUMENTS

| | | |
|---|---|---|
| CN | 102101668 B | 5/2012 |
| EP | 1 255 261 A1 | 11/2002 |
| EP | 1 256 966 A1 | 11/2002 |
| JP | H 01155108 A | 6/1989 |
| JP | H 0269916 A | 3/1990 |
| JP | H 02125410 A | 5/1990 |
| JP | H 04196511 A | 7/1992 |
| JP | H 0847927 A | 2/1996 |
| JP | H 09320906 A | 12/1997 |
| JP | H 1131523 A | 2/1999 |
| JP | 2001146410 A | 5/2001 |
| JP | 2002246277 A | 8/2002 |
| JP | 2003243265 | 8/2003 |
| JP | 2004253562 | 9/2004 |
| JP | 2004296181 A | 10/2004 |
| JP | 3848435 B2 | 11/2006 |
| JP | 4259900 B2 | 4/2009 |
| JP | 4618929 B2 | 1/2011 |
| JP | 4668377 B2 | 4/2011 |
| JP | 2011176043 A | 9/2011 |
| JP | 2012069408 | 4/2012 |
| JP | 5207338 B2 | 6/2013 |
| JP | 2016001672 A | 1/2016 |
| KR | 100733391 B1 | 6/2007 |
| KR | 20130134964 A | 12/2013 |
| WO | WO 01/37295 A1 | 5/2001 |
| WO | WO 2016/057983 A2 | 4/2016 |

OTHER PUBLICATIONS

International Search Report and Written Opinion for PCT/US2017/03138 dated Aug. 30, 2017, 14 pages.

* cited by examiner

ULTRACAPACITOR FOR USE AT HIGH TEMPERATURES

RELATED APPLICATIONS

The present application claims priority to U.S. Provisional Application Ser. No. 62/339,173, filed on May 20, 2016, which is incorporated herein in its entirety by reference thereto.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, many conventional ultracapacitors are sensitive to high temperatures, which may lead to reduced capacitance and increased equivalent series resistance ("ESR"). As such, a need currently exists for an improved ultracapacitor that can operate at high temperatures and still maintain stable electrical properties.

SUMMARY OF THE INVENTION

In accordance with one embodiment of the present invention, an ultracapacitor is disclosed that is in contact with a hot atmosphere having a temperature of about 80° C. or more. The ultracapacitor comprises a first electrode that comprises a first current collector electrically coupled to a first carbonaceous coating and a second electrode that comprises a second current collector electrically coupled to a second carbonaceous coating. The first current collector and the second current collector each contain a substrate that includes a conductive metal. A separator is positioned between the first electrode and the second electrode, and a nonaqueous electrolyte in ionic contact with the first electrode and the second electrode. The ultracapacitor also comprises a housing within which the first electrode, the second electrode, the separator, and the electrolyte are retained. The capacitor exhibits a capacitance value within the hot atmosphere of about 6 Farads per cubic centimeter or more as determined at a frequency of 120 Hz and without an applied voltage.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
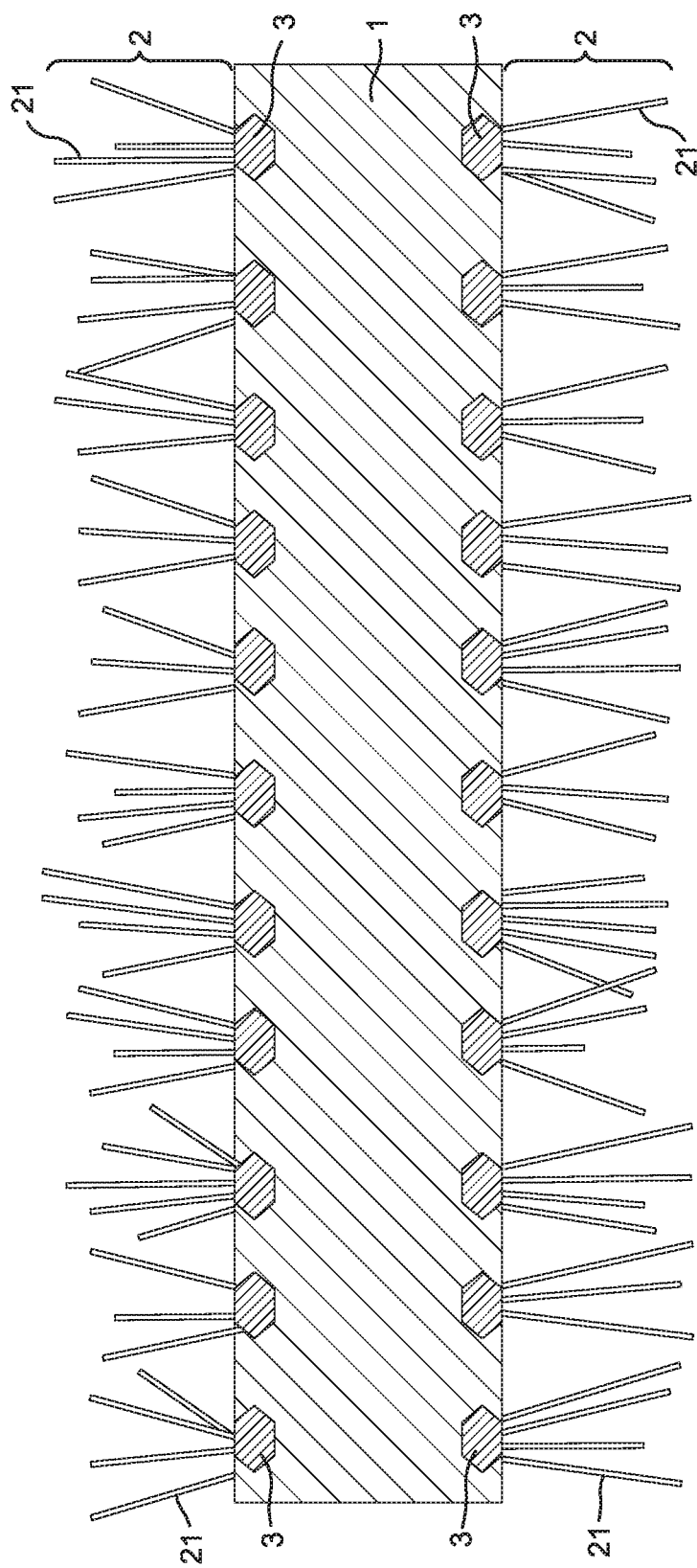
FIG. 1 is a schematic view of one embodiment of a current collector that may be employed in the ultracapacitor of the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed an ultracapacitor that is capable of exhibiting good properties at high temperatures. The ultracapacitor contains a first electrode that contains a first carbonaceous coating (e.g., activated carbon particles) electrically coupled to a first current collector, and a second electrode that contains a second carbonaceous coating (e.g., activated carbon particles) electrically coupled to a second current collector. A separator is also positioned between the first electrode and the second electrode, and an electrolyte is in ionic contact with the first electrode and the second electrode. The first electrode, second electrode, separator, and electrotype are retained within a housing.

The present inventors have discovered that through selective control over the particular nature of the materials used to form the current collector(s) and electrode(s), as well as the manner in which they are formed, a variety of beneficial properties may be achieved. That is, the resulting ultracapacitor may exhibit excellent electrical properties even when exposed to high temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). Even at such high temperatures, the capacitance may be about 6 Farads per cubic centimeter ("F/cm³") or more, in some embodiments about 8 F/cm³ or more, in some embodiments from about 9 to about 100 F/cm³, and in some embodiments, from about 10 to about 80 F/cm³, measured at a frequency of 120 Hz and without an applied voltage. The capacitance can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours). In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0.

Notably, such high capacitance values can also be maintained under various extreme conditions, such as when applied with a voltage and/or in a humid atmosphere. For example, the ratio of the capacitance value of the ultracapacitor after being exposed to the hot atmosphere (e.g., 85°

C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

When exposed to a hot atmosphere within the temperature ranged noted above, the ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a frequency of 1 kHz and without an applied voltage. The ESR can also remain stable at such temperatures for a substantial period of time, such as noted above. In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

Various embodiments of the present invention will now be described in more detail.

I. Electrodes

As indicated above, the first and second electrodes of the present invention contain first and second current collectors, respectively. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

In certain embodiments, at least one of the first and second current collectors, and preferably both, also contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). Referring to FIG. 1, for instance, one embodiment of a current collector is shown that contains a plurality of whiskers 21 projecting outwardly from a substrate 1. If desired, the whiskers 21 may optionally project from a seed portion 3 that is embedded within the substrate 1. Similar to the whiskers 21, the seed portion 3 may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

Figure 2:
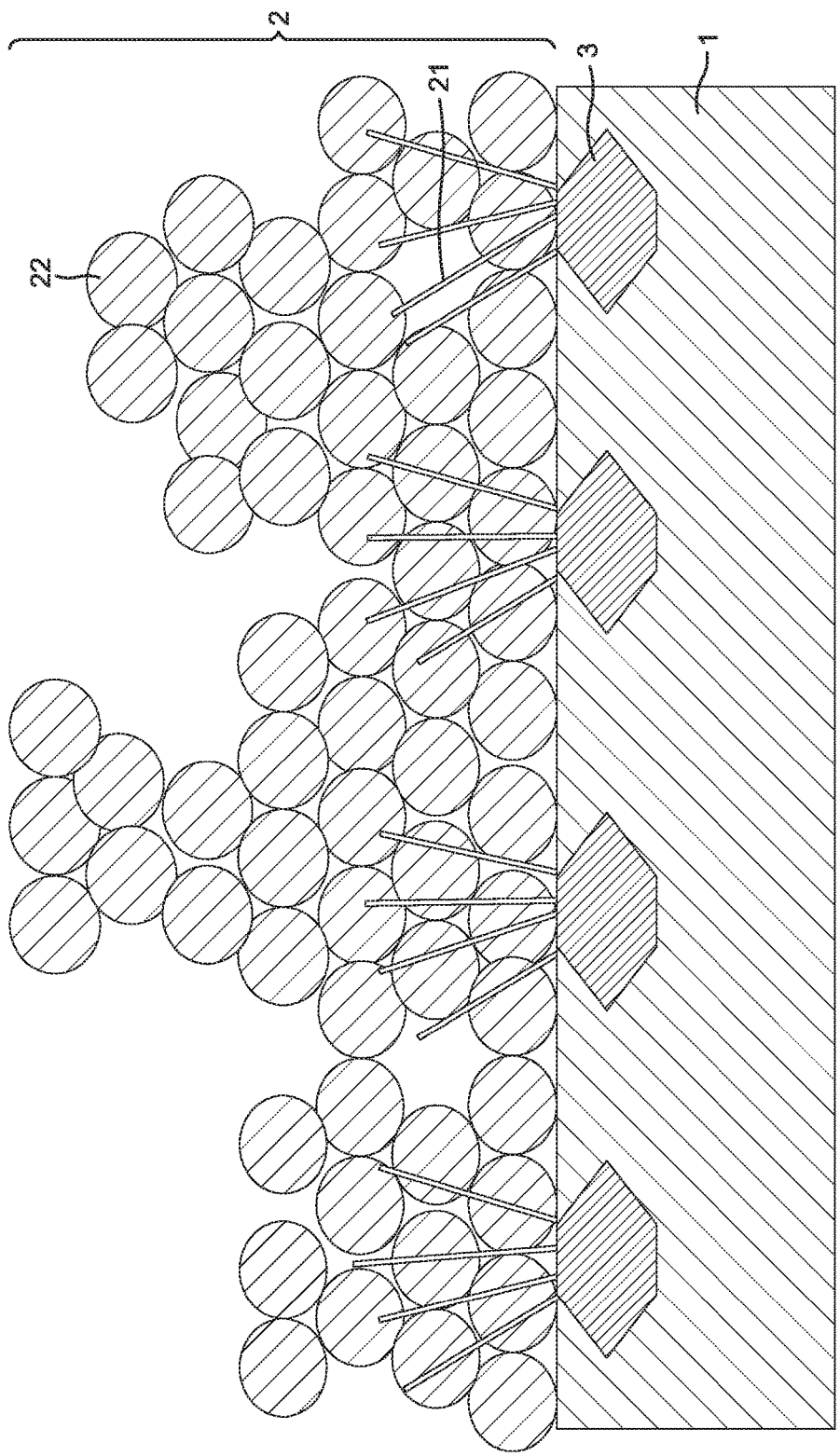
FIG. 2 is a schematic view of one embodiment of a current collector/carbonaceous coating configuration that may be employed in the ultracapacitor of the present invention.

The ultracapacitor also contains first and second carbonaceous coatings that are electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Referring to FIG. 2, for example, carbon particles 22 may be disposed over the current collector 1. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

As discussed above, one unique aspect of the present invention is that the electrodes need not contain a substantial amount of binders conventionally employed in ultracapacitor electrodes. That is, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

II. Nonaqueous Electrolyte

The electrolyte employed in the ultracapacitor is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

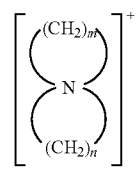

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

III. Separator

As indicated above, the ultracapacitor of the present invention also contains a separator that is positioned between the first and second electrodes. If desired, other separators may also be employed in the ultracapacitor of the present invention. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

IV. Housing

Figure 5:
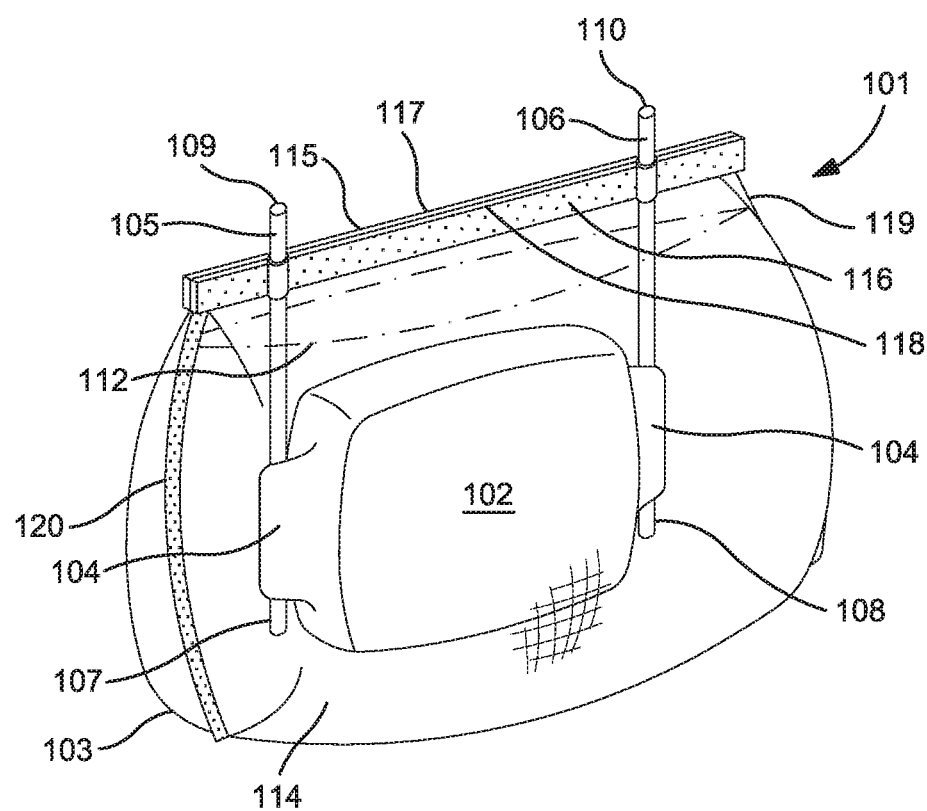
FIG. 5 is a schematic view of another embodiment of the ultracapacitor of the present invention.

The ultracapacitor of the present invention employs a housing within which the electrodes, electrolyte, and separator are retained and optionally hermetically sealed. The nature of the housing may vary as desired. In certain embodiments, for example, the housing may be in the form of a flexible package that encloses the components of the ultracapacitor. Referring to FIG. 5, for example, one embodiment of an ultracapacitor 101 is shown that contains a flexible package 103 that encloses an electrode assembly 102 and electrolyte 112. The electrode assembly 102 may contain electrodes 105 and 106 and a separator (not shown) stacked in a face to face configuration and connected together by opposing tabs 104. The ultracapacitor 101 also contains a first terminal 105 and a second terminal 106, which are respectively electrically connected with the tabs 104. More particularly, the electrodes 105 and 106 have first ends 107 and 108 disposed within the package 103 and respective second ends 109 and 110 disposed outside of the package 103. It should be understood that apart from stacking, the electrode assembly may be provided in any other form desired. For example, the electrodes may be folded or wounded together in a jelly roll configuration.

The package 103 generally includes a substrate 114 that extends between two ends 115 and 116 and that has edges 117, 118, 119 and 120. The ends 115 and 116, as well as the portions of both sides 119 and 120 that overlap, are fixedly and sealingly abutted against one another (e.g., by heat welding). In this manner, the electrolyte 112 can be retained within the package 103. The substrate 114 typically has a thickness within the range of from about 20 micrometers to about 1,000 micrometers, in some embodiments from about 50 micrometers to about 800 micrometers, and in some embodiments, from about 100 micrometers to about 600 micrometers.

The substrate 114 may contain any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the package. In this manner, the barrier layer is positioned between the outer layer and the electrode assembly. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain an inner layer that is positioned between the electrode assembly and the barrier layer. In certain embodiments, the inner layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth)acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

Apart from a flexible package, such as described above, other housing configurations may also be employed. For example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 3:
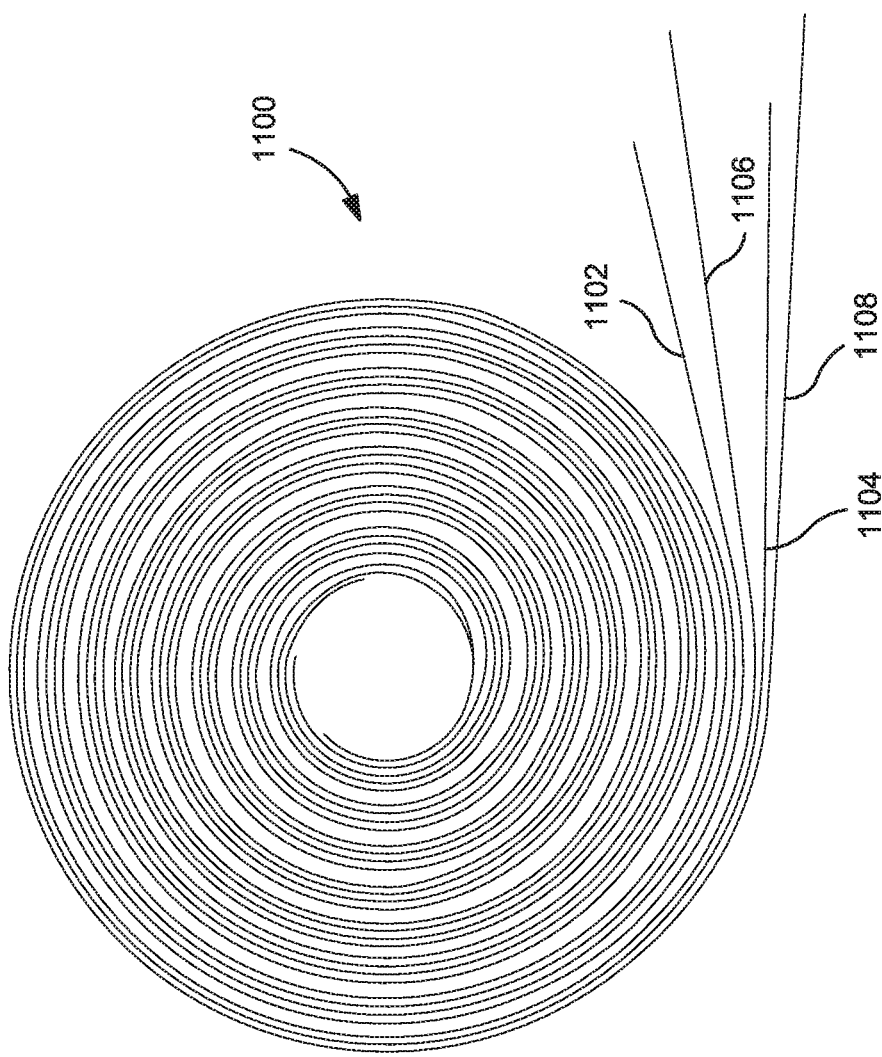
FIG. 3 is a schematic view illustrating one embodiment for forming an electrode assembly that can be used in the ultracapacitor of the present invention.

The manner in which these components are inserted into the housing may vary as is known in the art. For example, the electrodes and separator may be initially folded, wound, or otherwise contacted together to form an electrode assembly. The electrolyte may optionally be immersed into the electrodes of the assembly. In one particular embodiment, the electrodes, separator, and optional electrolyte may be wound into an electrode assembly having a "jelly-roll" configuration. Referring to FIG. 3, for instance, one embodiment of such a jellyroll electrode assembly 1100 is shown that contains a first electrode 1102, second electrode 1104, and a separator 1106 positioned between the electrodes 1102 and 1104. In this particular embodiment, the electrode assembly 1100 also includes another separator 1108 that is positioned over the second electrode 1104. In this manner, each of two coated surfaces of the electrodes is separated by a separator, thereby maximizing surface area per unit volume and capacitance. While by no means required, the electrodes 1102 and 1104 are offset in this embodiment so as to leave their respective contact edges extending beyond first and second edges of the first and second separators 1106 and 1108, respectively. Among other things, this can help prevent "shorting" due to the flow of electrical current between the electrodes.

Figure 4:
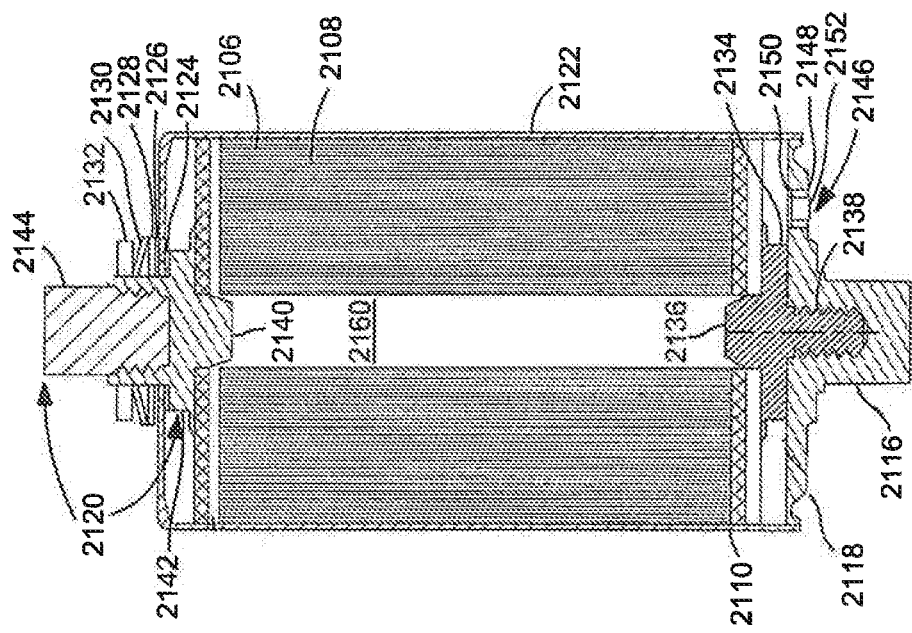
FIG. 4 is a schematic view of one embodiment of the ultracapacitor of the present invention.

The electrode assembly may be sealed within the cylindrical housing using a variety of different techniques. Referring to FIG. 4, one embodiment of an ultracapacitor is shown that contains an electrode assembly 2108, which contains layers 2106 wound together in a jellyroll configuration as discussed above. In this particular embodiment, the ultracapacitor contains a first collector disc 2114, which contains a disc-shaped portion 2134, a stud portion 2136, and a fastener 2138 (e.g., screw). The collector disc 2114 is aligned with a first end of a hollow core 2160, which is formed in the center of the electrode assembly, and the stud portion 2136 is then inserted into an opening of the core so that the disc-shaped portion 2134 sits against the first end of the electrode assembly 2108 at a first contact edge 2110. A lid 2118 is welded (e.g., laser welded) to a first terminal post 2116, and a socket, which may be for example, threaded, is coupled to the fastener 2138. The ultracapacitor also contains a second collector disc 2120, which contains a disc-shaped portion 2142, a stud portion 2140, and a second terminal post 2144. The second collector disc 2120 is aligned with the second end of the hollow core 2160, and the stud portion 2140 is then inserted into the opening of the core so that the collector disc portion 2142 sits against the second end of the electrode assembly 2108.

A metal container 2122 (e.g., cylindrically-shaped can) is thereafter slid over the electrode assembly 2108 so that the second collector disc 2120 enters the container 2122 first, passes through a first insulating washer 2124, passes through an axial hole at an end of the container 2122, and then passes through a second insulating washer 2126. The second collector disc 2120 also passes through a flat washer 2128 and a spring washer 2130. A locknut 2132 is tightened over the spring washer 2130, which compresses the spring washer 2130 against the flat washer 2128, which in turn is compressed against the second insulating washer 2126. The second insulating washer 2126 is compressed against the exterior periphery of the axial hole in the metal container 2122, and as the second collector disc 2120 is drawn by this compressive force toward the axial hole, the first insulating washer 2124 is compressed between the second collector disc 2120 and an interior periphery of the axial hole in the container 2122. A flange on the first insulating washer 2124 inhibits electrical contact between the second collector disc 2120 and a rim of the axial hole. Simultaneously, the lid 2118 is drawn into an opening of the container 2122 so that a rim of the lid 2118 sits just inside a lip of the opening of the container 2122. The rim of the lid 2118 is then welded to the lip of the opening of the container 2122.

Once the locknut 2132 is tightened against the spring washer 2130, a hermetic seal may be formed between the axial hole, the first insulating washer 2124, the second insulating washer 2126, and the second collector disc 2120. Similarly, the welding of the lid 2118 to the lip of the container 2122, and the welding of the lid 2118 to the first terminal post 2116, may form another hermetic seal. A hole 2146 in the lid 2118 can remain open to serve as a fill port for the electrolyte described above. Once the electrolyte is in the can (i.e., drawn into the can under vacuum, as described above), a bushing 2148 is inserted into the hole 2146 and seated against a flange 2150 at an interior edge of the hole 2146. The bushing 2148 may, for instance, be a hollow cylinder in shape, fashioned to receive a plug 2152. The plug 2152, which is cylindrical in shape, is pressed into a center of the bushing 2148, thereby compressing the bushing 2148 against an interior of the hole 2146 and forming a hermetic seal between the hole 2146, the bushing 2148, and the plug 2152. The plug 2152 and the bushing 2148 may be selected to dislodge when a prescribed level of pressure is reached within the ultracapacitor, thereby forming an overpressure safety mechanism.

The embodiments described above generally refer to the use of a single electrochemical cell in the capacitor. It should of course be understood, however, that the capacitor of the present invention may also contain two or more electrochemical cells. In one such embodiment, for example, the capacitor may include a stack of two or more electrochemical cells, which may be the same or different.

The present invention may be better understood with reference to the following example.

TEST METHODS

Equivalent Series Resistance (ESR)

Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 85° C. or 105° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 85° C. or 105° C., and the relative humidity may be 25% or 85%.

EXAMPLE

The ability to form an electrochemical cell in accordance with the present invention was demonstrated. Initially, each side of two aluminum current collectors (thickness of 12 to 50 μm) containing aluminum carbide whiskers were coated with a mixture of 10-40 wt. % of activated carbon particles, 2-10 wt. % of a styrene-butadiene copolymer, and 5-40 wt. % of sodium carboxymethylcellulose. The activated carbon particles had a D50 size of about 5-20 μm and a BET surface area of about 1300-2200 $m^2/g$. The activated carbon particles contained pores with a size of less than 2 nanometers in an amount of less than 10 vol. %, pores with a size of 2 to 50 nanometers in an amount of about 40 to 70 vol. %, and pores with a size of greater than 50 nm in an amount of about 20 to 50 vol. %. The thickness of each resulting coating was about 12 to 200 μm. The electrodes were then calendered and dried under vacuum at a temperature of from 70° C. to 150° C. Once formed, the two electrodes were assembled with an electrolyte and separators (cellulose material having a thickness of 25 μm). The electrolyte contained 5-azoniaspiro[4,4]-nonanetetrafluoroborate at a concentration of 1.05 to 2.5 M in propylene carbonate. The resulting strip is cut into individual electrodes and assembled by stacking electrodes alternately with separators therebetween. Once the electrode stack is complete, all electrode terminals are welded to a single aluminum terminal. This assembly is then put into a plastic/aluminum/plastic laminated packaging material and all but one of the edges are heat sealed together. Next, the electrolyte is injected into the package through the open edge. The electrolyte-filled package is then put under vacuum and the final edge is heat sealed to complete the finished package. The resulting cells were formed and tested for ESR and capacitance. The results are set forth below in Tables 1-6:

TABLE 1

Average ESR (mohms) for 24 Samples at 0.0 Volt Bias

| | Time (hrs) | | | | | | | | | |
|---|---|---|---|---|---|---|---|---|---|---|
| | 0 | 168 | 336 | 504 | 672 | 840 | 1008 | 1512 | 2040 | 3024 | 4032 |
| 85° C. | 65 | 61 | 59 | 62 | 64 | 63 | 64 | 64 | 62 | 62 | 64 |
| 105° C. | 62 | 54 | 52 | 57 | 60 | 60 | 60 | 58 | 58 | 57 | 58 |

TABLE 2

Average Capacitance for 24 Samples at 0.0 Volt Bias

| | Time (hrs) | | | | | | | | | |
|---|---|---|---|---|---|---|---|---|---|---|
| | 0 | 168 | 336 | 504 | 672 | 840 | 1008 | 1512 | 2040 | 3024 | 4032 |
| 85° C. F | 2.1 | 2.0 | 2.0 | 2.0 | 1.9 | 1.9 | 1.9 | 2.0 | 2.0 | 2.0 | 1.9 |
| 85° C. F/cm³ | 10.3 | 10.1 | 9.8 | 9.7 | 9.7 | 9.7 | 9.7 | 9.7 | 9.7 | 9.7 | 9.6 |
| 105° C. F | 2.0 | 2.0 | 1.9 | 1.9 | 1.9 | 1.9 | 1.9 | 1.9 | 1.9 | 1.9 | 1.8 |
| 105° C. F/cm³ | 9.9 | 9.9 | 9.7 | 9.6 | 9.5 | 9.4 | 9.4 | 9.4 | 9.3 | 9.2 | 9.0 |

TABLE 3

Average ESR (mohms) for 16 Samples at 0.0 Volt Bias

| | Time (hrs) | | | | | | |
|---|---|---|---|---|---|---|---|
| | 0 | 168 | 336 | 504 | 672 | 840 | 1008 |
| 85° C., 85% Relative Humidity | 121 | 133 | 144 | 152 | 166 | 177 | 187 |

TABLE 4

Average Capacitance for 16 Samples at 0.0 Volt Bias

| | | Time (hrs) | | | | | | |
|---|---|---|---|---|---|---|---|---|
| | | 0 | 168 | 336 | 504 | 672 | 840 | 1008 |
| 85° C., 85% Relative Humidity | F | 1.5 | 1.2 | 1.1 | 1.2 | 1.1 | 1.1 | 1.1 |
| 85° C., 85% Relative Humidity | F/cm³ | 7.7 | 5.7 | 5.7 | 6.0 | 5.5 | 5.6 | 5.5 |

TABLE 5

Average ESR (mohms) for 10 Samples at 2.1 Volt Bias

| | Time (hrs) | | | | | | |
|---|---|---|---|---|---|---|---|
| | 0 | 168 | 336 | 504 | 672 | 840 | 1008 |
| 85° C. | 146 | 163 | 167 | 169 | 171 | 173 | 175 |

TABLE 6

Average Capacitance for 16 Samples at 2.1 Volt Bias

| | | Time (hrs) | | |
|---|---|---|---|---|
| | | 0 | 504 | 1008 |
| 85° C., 85% Relative Humidity | F | 2.0 | 1.8 | 1.7 |
| 85° C., 85% Relative Humidity | F/cm³ | 10.1 | 9.2 | 8.7 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor comprising:
a first electrode that comprises a first current collector electrically coupled to a first carbonaceous coating;
a second electrode that comprises a second current collector electrically coupled to a second carbonaceous coating, wherein the first current collector and the second current collector each contain a substrate that includes a conductive metal;
a separator positioned between the first electrode and the second electrode;
a nonaqueous electrolyte that is in ionic contact with the first electrode and the second electrode; and a housing within which the first electrode, the second electrode, the separator, and the electrolyte are retained;

wherein the capacitor exhibits a capacitance value of about 6 Farads per cubic centimeter or more, as determined in a hot atmosphere having a temperature of 85° C. at a frequency of 120 Hz and without an applied voltage, further wherein the ratio of the capacitance value of the ultracapacitor after being exposed to the hot atmosphere for 1008 hours to the capacitance value of the ultracapacitor when initially exposed to the hot atmosphere is about 0.75 or more.

2. The ultracapacitor of claim 1, wherein the ratio of the capacitance value of the ultracapacitor after being exposed to the hot atmosphere and an applied voltage of about 1 volt or more to the initial capacitance value of the ultracapacitor when exposed to the hot atmosphere but prior to being applied with the applied voltage is about 0.60 or more.

3. The ultracapacitor of claim 1, wherein the ratio of the capacitance value of the ultracapacitor after being exposed to the hot atmosphere and a humidity level of about 40% or more to the initial capacitance value of the ultracapacitor when exposed to the hot atmosphere but prior to being exposed to the humidity level is about 0.7 or more.

4. The ultracapacitor of claim 1, wherein the ultracapacitor has an ESR of about 150 mohms or less as determined in the hot atmosphere at a frequency of 1 kHz and without an applied voltage.

5. The ultracapacitor of claim 1, wherein the ratio of the ESR of the ultracapacitor after being exposed to the hot atmosphere for 1008 hours to the ESR of the ultracapacitor when initially exposed to the hot atmosphere is about 1.5 or less.

6. The ultracapacitor of claim 1, wherein the ratio of the ESR of the ultracapacitor after being exposed to the hot atmosphere and an applied voltage of about 1 volt or more to the initial ESR of the ultracapacitor when exposed to the hot atmosphere but prior to being applied with the applied voltage is about 1.8 or less.

7. The ultracapacitor of claim 1, wherein the ratio of the ESR of the ultracapacitor after being exposed to the hot atmosphere and a humidity level of about 40% or more to the initial ESR of the ultracapacitor when exposed to the hot atmosphere but prior to being exposed to the humidity level is about 1.5 or less.

8. The ultracapacitor of claim 1, wherein the conductive metal is aluminum or an alloy thereof.

9. The ultracapacitor of claim 1, wherein a plurality of fiber-like whiskers project outwardly from the substrate of the first current collector, the substrate of the second current collector, or both.

10. The ultracapacitor of claim 9, wherein the whiskers contain a carbide of the conductive metal.

11. The ultracapacitor of claim 1, wherein the first carbonaceous coating, the second carbonaceous coating, or both contain activated carbon particles.

12. The ultracapacitor of claim 11, wherein at least 50% by volume of the activated carbon particles have a size of from about 0.01 to about 30 micrometers.

13. The ultracapacitor of claim 11, wherein the activated carbon particles contain a plurality of pores, wherein the amount of pores having a size of about 2 nanometers or less is about 50 vol. % or less of the total pore volume, the amount of pores having a size of from about 2 nanometers to about 50 nanometers is about 20 vol. % to about 80 vol. % of the total pore volume, and the amount of pores having a size of about 50 nanometers or more is from about 1 vol. % to about 50 vol. % of the total pore volume.

14. The ultracapacitor of claim 1, wherein the nonaqueous electrolyte contains an ionic liquid that is dissolved in a nonaqueous solvent, wherein the ionic liquid contains a cationic species and a counterion.

15. The ultracapacitor of claim 14, wherein the nonaqueous solvent includes propylene carbonate.

16. The ultracapacitor of claim 14, wherein the cationic species includes an organoquaternary ammonium compound.

17. The ultracapacitor of claim 16, wherein the organoquaternary ammonium compound has the following structure:

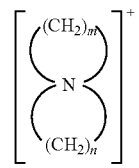

wherein m and n are independently a number from 3 to 7.

18. The ultracapacitor of claim 14, wherein the ionic liquid is present at a concentration of about 1.0 M or more.

19. The ultracapacitor of claim 1, wherein the separator includes a cellulosic fibrous material.

20. The ultracapacitor of claim 1, wherein the housing contains a flexible package.

21. The ultracapacitor of claim 20, wherein the flexible package contains a barrier layer that includes a metal.

22. The ultracapacitor of claim 21, wherein the flexible package further contains an outer layer, wherein the barrier layer is positioned between the outer layer and the electrodes.

23. The ultracapacitor of claim 22, wherein the outer layer contains a film that includes a polyolefin, polyester, or a combination thereof.

24. The ultracapacitor of claim 22, wherein the flexible package further comprises an inner layer, wherein the inner layer is positioned between the barrier layer and the electrodes.

25. The ultracapacitor of claim 24, wherein the inner layer contains an ionomer.

26. The ultracapacitor of claim 1, wherein the housing contains a metal container.

27. The ultracapacitor of claim 26, wherein the metal container has a cylindrical shape.

28. The ultracapacitor of claim 1, wherein the first electrode, the second electrode, and the separator are wound into an electrode assembly having a jellyroll configuration.

29. The ultracapacitor of claim 1, wherein the hot atmosphere has a temperature of 105° C.

30. An ultracapacitor comprising:
a first electrode that comprises a first current collector electrically coupled to a first carbonaceous coating;
a second electrode that comprises a second current collector electrically coupled to a second carbonaceous coating, wherein the first current collector and the second current collector each contain a substrate that includes a conductive metal;
a separator positioned between the first electrode and the second electrode;
a nonaqueous electrolyte that is in ionic contact with the first electrode and the second electrode; and a housing within which the first electrode, the second electrode, the separator, and the electrolyte are retained;

wherein the capacitor exhibits a capacitance value of about 6 Farads per cubic centimeter or more, as determined in a hot atmosphere having a temperature of 85° C. at a frequency of 120 Hz and without an applied voltage, further wherein the ratio of the ESR of the ultracapacitor after being exposed to the hot atmosphere and an applied voltage of about 1 volt or more to the initial ESR of the ultracapacitor when exposed to the hot atmosphere but prior to being applied with the applied voltage is about 1.8 or less.

31. The ultracapacitor of claim 30, wherein the ratio of the capacitance value of the ultracapacitor after being exposed to the hot atmosphere for 1008 hours to the capacitance value of the ultracapacitor when initially exposed to the hot atmosphere is about 0.75 or more.

32. The ultracapacitor of claim 30, wherein the ratio of the capacitance value of the ultracapacitor after being exposed to the hot atmosphere and an applied voltage of about 1 volt or more to the initial capacitance value of the ultracapacitor when exposed to the hot atmosphere but prior to being applied with the applied voltage is about 0.60 or more.

33. The ultracapacitor of claim 30, wherein the ratio of the capacitance value of the ultracapacitor after being exposed to the hot atmosphere and a humidity level of about 40% or more to the initial capacitance value of the ultracapacitor when exposed to the hot atmosphere but prior to being exposed to the humidity level is about 0.7 or more.

34. The ultracapacitor of claim 30, wherein the ultracapacitor has an ESR of about 150 mohms or less as determined in the hot atmosphere at a frequency of 1 kHz and without an applied voltage.

35. The ultracapacitor of claim 30, wherein the ratio of the ESR of the ultracapacitor after being exposed to the hot atmosphere for 1008 hours to the ESR of the ultracapacitor when initially exposed to the hot atmosphere is about 1.5 or less.

36. The ultracapacitor of claim 30, wherein the ratio of the ESR of the ultracapacitor after being exposed to the hot atmosphere and a humidity level of about 40% or more to the initial ESR of the ultracapacitor when exposed to the hot atmosphere but prior to being exposed to the humidity level is about 1.5 or less.

37. The ultracapacitor of claim 30, wherein the hot atmosphere has a temperature of 105° C.

* * * * *